US012636853B2

(12) United States Patent
Tsai et al.

(10) Patent No.: US 12,636,853 B2
(45) Date of Patent: May 26, 2026

(54) GRID STRUCTURES HAVING GLUELESS SLEEVE JOINTS AND METHODS OF MANUFACTURING AND USING THE SAME

(71) Applicants: The Board of Trustees of the Leland Stanford Junior University, Stanford, CA (US); Agency for Science, Technology and Research, Singapore (SG); University of Southern California, Los Angeles, CA (US)

(72) Inventors: Stephen W. Tsai, Honolulu, HI (US); Dan Wang, Clementi (SG); Erik Kappel, Lindwedel (DE); Bo Jin, Los Angeles, CA (US); Antonio Miravete, Lemoore, CA (US)

(73) Assignees: The Board of Trustees of the Leland Stanford Junior University; Agency for Science, Technology and Research, Singapore (SG); University of Southern California

(*) Notice: Subject to any disclaimer, the term of this patent is extended or adjusted under 35 U.S.C. 154(b) by 352 days.

(21) Appl. No.: 18/158,934

(22) Filed: Jan. 24, 2023

(65) Prior Publication Data

US 2023/0234325 A1 Jul. 27, 2023

Related U.S. Application Data

(60) Provisional application No. 63/302,309, filed on Jan. 24, 2022.

(51) Int. Cl.
| | |
|---|---|
| *B32B 3/26* | (2006.01) |
| *B32B 3/06* | (2006.01) |

(Continued)

(52) U.S. Cl.
CPC ................ *B32B 3/263* (2013.01); *B32B 3/06* (2013.01); *B32B 3/085* (2013.01); *B32B 3/12* (2013.01);

(Continued)

(58) Field of Classification Search
None
See application file for complete search history.

(56) References Cited

U.S. PATENT DOCUMENTS

| | | | |
|---|---|---|---|
| 4,063,981 A | 12/1977 | Rhodes et al. | |
| 5,429,845 A | 7/1995 | Newhouse et al. | |

(Continued)

FOREIGN PATENT DOCUMENTS

| | | |
|---|---|---|
| EP | 2772351 A1 | 9/2014 |
| EP | 2830042 A1 | 1/2015 |

(Continued)

OTHER PUBLICATIONS

Rashed et al., 2016, Metallic microlattice materials: A current state of the art on manufacturing, mechanical properties and applications (Year: 2014).*

(Continued)

*Primary Examiner* — Elizabeth Collister
(74) *Attorney, Agent, or Firm* — Alston & Bird LLP

(57) ABSTRACT

A grid and skin assembly for use in a composite laminate structure is described. The assembly includes a metallic grid having a plurality of intersecting ribs oriented in at least two distinct rib directions offset at a grid angle relative to one another and defining respective intersection points; and a composite laminate skin having a plurality of ply layers comprising a plurality of tapes oriented in at least two distinct tape directions offset at a ply angle relative to one another. The grid angle is at least 25 degrees, the intersection points define glueless joints of the metallic grid, and the grid (Continued)

is a non-aluminum-based material. A grid and method of manufacturing the grid and skin assembly is also described. The method includes a water jet cutting procedure and glueless joint formation due to differing thermal expansion characteristics of the grid and skin.

20 Claims, 19 Drawing Sheets

(51) Int. Cl.

| | |
|---|---|
| *B32B 3/08* | (2006.01) |
| *B32B 3/12* | (2006.01) |
| *B32B 7/03* | (2019.01) |
| *B32B 15/18* | (2006.01) |
| *B32B 38/00* | (2006.01) |

(52) U.S. Cl.
CPC ............... *B32B 7/03* (2019.01); *B32B 15/18* (2013.01); *B32B 38/0004* (2013.01); *B32B 38/004* (2013.01); *B32B 2305/38* (2013.01); *B32B 2311/18* (2013.01); *B32B 2311/30* (2013.01); *B32B 2597/00* (2013.01)

(56) References Cited

U.S. PATENT DOCUMENTS

| | | | | |
|---|---|---|---|---|
| 5,476,189 | A | 12/1995 | Duvall et al. | |
| 9,296,174 | B2 | 3/2016 | Tsai et al. | |
| 11,446,897 | B2 | 9/2022 | Tsai et al. | |
| 2006/0093802 | A1 | 5/2006 | Tsai et al. | |
| 2012/0177872 | A1 | 7/2012 | Tsai et al. | |
| 2014/0170371 | A1 | 6/2014 | Kamiya et al. | |
| 2015/0030805 | A1 | 1/2015 | Tsai et al. | |
| 2016/0250820 | A1* | 9/2016 | Hundley ............... | B29C 33/424 |
| | | | | 428/116 |
| 2020/0115892 | A1* | 4/2020 | Truxel ................... | B33Y 80/00 |
| 2021/0114336 | A1 | 4/2021 | Tsai et al. | |
| 2022/0242087 | A1 | 8/2022 | Tsai et al. | |
| 2022/0297407 | A1 | 9/2022 | Tsai et al. | |
| 2022/0363019 | A1 | 11/2022 | Tsai et al. | |

FOREIGN PATENT DOCUMENTS

| | | | |
|---|---|---|---|
| EP | 2663450 | B1 | 7/2018 |
| WO | WO 2018/181983 | A1 | 10/2018 |
| WO | WO 2018/187186 | A1 | 10/2018 |
| WO | WO 2020/252126 | A1 | 12/2020 |

OTHER PUBLICATIONS

Tianlin Zhong, Ketai He, Huaixue Li, Lechang Yang, Mechanical properties of lightweight 316L stainless steel lattice structures fabricated by selective laser melting, Materials & Design, vol. 181, 2019 (Year: 2019).*

Akbulut, et al., "Optimum design of composit laminates for minimum thickness," computer and Structures, 86, 1974-1982, (2008).

An, et al., "Stacking sequence optimization and blending design of laminated composite structures," Structural and Mulitdisciplinary Optimization, published online Nov. 28, 2018, doi.org/10.1007/s00158-018-2158-1.

Chen et al., "Optimal design of composite laminates for minimizing delamination stresses by particle swarm optimization combined with FEM," Structural Engineering and Mechanics, vol. 31, No. 4, 407-421, (2009).

Hühne, C. et al. Robust Design Of Composite Cylindrical Shells Under Axial Compression—Simulation and Validation, Thin-Walled Structures, Issue 46, (2008), pp. 947-962.

Khot, N.S. On The Influence Of Initial Geometric Imperfections On The Buckling and Postbuckling Behavior Of Fiber-Reinforced Cylindrical Shells Under Uniform Axial Compression, Technical Report AFFDL-TR-68-136, Oct. 1968, (69 pages), Air Force Flight Dynamics Laboratory Wright-Patterson Air Force Base, Ohio.

Zhang, et al., "Winding orientation optimization design of composite tubes based on quasi-static and dynamic experiments," Thin-Walled Structures, 127, 425-433, (2018).

U.S. Appl. No. 16/500,337, Non-Final Office Action mailed May 13, 2021.

U.S. Appl. No. 16/500,337, Notice of Allowance mailed May 11, 2022.

U.S. Appl. No. 16/500,337, Requirement for Restriction/Election mailed Jan. 26, 2021.

U.S. Appl. No. 16/500,337, Non-Final Office Action mailed Nov. 12, 2021.

WIPO Application No. PCT/US2018/025600, PCT International Preliminary Report on Patentability mailed Oct. 8, 2019.

WIPO Application No. PCT/US2018/025600, PCT International Search Report and Written Opinion of the International Searching Authority mailed Jul. 17, 2018.

WIPO Application No. PCT/US2020/037171, PCT International Preliminary Report on Patentability mailed Dec. 14, 2021.

WIPO Application No. PCT/US2020/037171, PCT International Search Report and Written Opinion of the International Searching Authority mailed Sep. 18, 2020.

\* cited by examiner

DOUBLE-DOUBLE FIELD [±ψ]

| A₁₁° | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.158 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

(a) Skin outside grid (a) Skin inside grid (c) Sandwich grid

A cut of the outer skin to show the inner grid

Inner skin
Sandwich grid
Outer skin

290

(a) Curved grid in Table 1 for axial compression (b) Curved grid in Table 2 for bending (c) ±50° grid

GRID STRUCTURES HAVING GLUELESS SLEEVE JOINTS AND METHODS OF MANUFACTURING AND USING THE SAME

CROSS-REFERENCE TO RELATED APPLICATIONS

This application claims priority to and the benefit of U.S. Provisional Patent Application Ser. No. 63/302,309 filed Jan. 24, 2022; the contents of which as are hereby incorporated by reference in their entirety.

BACKGROUND

Technical Field

Various embodiments of the present invention relate generally to certain applications of grid structures (e.g., tubes or cylinders) constructed from metal and/or double-double laminate material such as carbon fiber reinforced polymer (CFRP). Applications may be joints for large piping for water, oil, or any industrial fluids; fuselage plugs and aluminum head joints; carbon cylindrical vessels or cryogenic vessels; and/or grid/skin construction for fuselage and box beams.

Description of Related Art

To enhance acceptance, conventional composite laminate structures were generally designed to emulate the strength characteristics of conventional metal-based laminate materials and as such are constrained to designs having layers of plies that are both symmetrical and balanced. Such conventional structures, when so constrained and containing at least three-ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIGS. 1A-1B). When one each of the layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered.

In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry and a limit of three on ply groupings (i.e., there are four plies, but they're provided in three groups, namely 0°, ±45° and 90°). For instance, if a sub-laminate has 10 layers, with five of them being 0°, the 0° plies may be separated into at least two groupings, namely a set of three and a set of two plies. Three or more groups such as three 1-ply and one 2-ply could be provided but having groups of four and one—or five all in one group—is not feasible for adhering to restrictive stacking sequences required for conventional legacy quad family of laminates.

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking and ply delamination. Complex procedures to blend adjacent laminates with different stacking and thickness, and to drop or add plies are required for a complex structure and impede optimization and manufacturing.

Inefficiencies arose in conventional composite laminate structures due to their discrete nature, exacerbated by self-inflicted constraints in the industry, including a perceived requirement that all composite laminate structures—and the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/ or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result less than optimal laminate structures were used.

Prior improvements upon conventional composite laminate structures include that of double-double sub-laminate structures, which provide a continuous field of opportunities, as compared to the discrete points of conventional configurations, as may be understood by comparison of FIGS. 1A-B with FIGS. 2A-B. Notably, the continuous field of double-double sub-laminate structures achieves sub-laminates with optimally 3-ply or 4-ply thick structures; even thinner 2- and 1-ply thick configurations are obtainable. Throughout, the ply angles are also continuous, making blending of different laminates and their optimization achievable. Sub-laminate thickness remains constant. As a result, far fewer failure modes (and virtually no unpredictable failure modes) are encountered, and automated layup procedures may be conducted in more efficient manners than conventionally available. All of these and still other advantages lead to much simpler and lighter structures that are also better optimized for purposes of efficiency and accuracy.

One exemplary and non-limiting application of double-double sub-laminate structures involves formation of grid, core, and/or skin structures, as may be understood generally with reference to FIGS. 3-4. These structures have generally been formed by producing a grid/skin panel using a high-speed tape laying machine, providing an orthogonal grid formed from sets of ribs, as illustrated. To match the height of the ribs and their joints (where two ribs meet), though, a discontinuous insert must be added in every other layer of tape in each rib. This requires cutting of continuous tape during ongoing manufacturing operations, resulting in inefficiencies for production and/or inaccuracies in tape due to inconsistencies or the like in the cutting performed.

Thus, a need exists to provide structures and methods of manufacturing and using the same that can eliminate observed inefficiencies and inaccuracies associated with utilization of continuous and/or finite length tapes of double-double sub-laminate structures and/or even conventional laminate structures.

BRIEF SUMMARY

Various embodiments described herein provide a grid and skin assembly for use in a composite laminate structure, the assembly comprising: a metallic grid having a plurality of intersecting ribs oriented in at least two distinct rib directions offset at a grid angle relative to one another and defining respective intersection points; and a composite laminate skin having a plurality of ply layers comprising a plurality of tapes oriented in at least two distinct tape directions offset at a ply angle relative to one another, wherein: the grid angle is at least 25 degrees; the intersection points define glueless joints of the metallic grid; and the metallic grid is a non-aluminum-based material.

Various embodiments described herein also provide a metallic grid structure for use in a composite laminate structure, the grid structure comprising a seamless metallic grid having a plurality of intersecting ribs oriented in at least two distinct rib directions offset at a grid angle relative to one another and defining respective intersection points, wherein: the intersection points define glueless joints of the metallic grid; and the metallic grid is a non-aluminum-based material.

Various embodiments described herein also provide a method of manufacturing a glueless grid and skin assembly for use in a composite laminate structure, the method comprising the steps of: providing a non-aluminum-based and planar component having a desired surface area and thickness; cutting the non-aluminum-based and planar component to define a metallic grid with a pattern defined by a plurality of intersecting ribs oriented in at least two distinct rib directions offset at a grid angle of at least 25 degrees relative to one another and defining respective intersection points; heating the metallic grid and a composite laminate skin having a plurality of ply layers comprising a plurality of tapes; and positioning the composite laminate skin adjacent at least one surface of the metallic grid and permitting the two to return to ambient temperature to define the glueless grid and skin assembly.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Figures 1A, 1B:
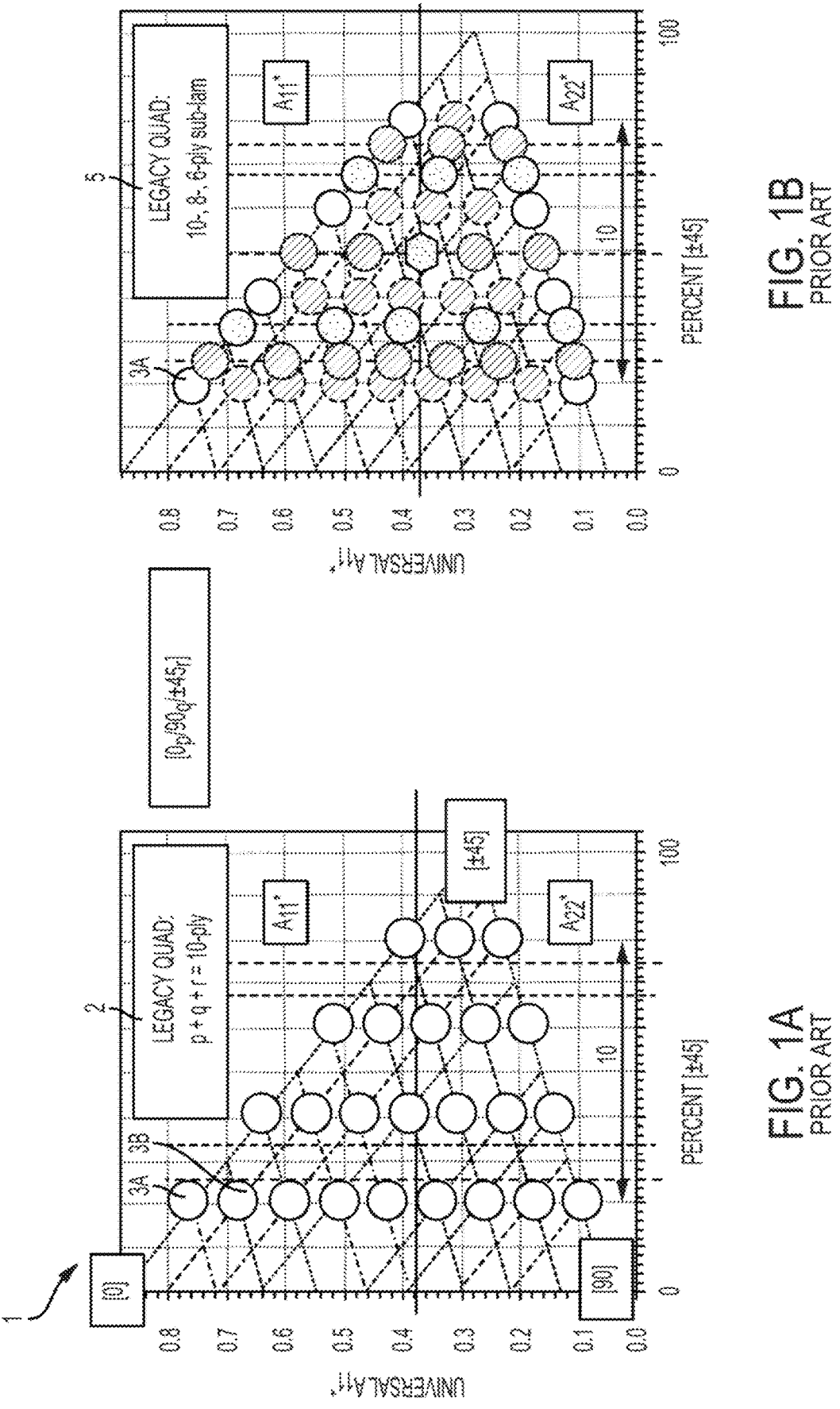
FIG. 1A shows a legacy quad conventional sub-laminate family, with focus upon a 10-ply configuration.
FIG. 1B shows a legacy quad conventional sub-laminate family, with focus additionally upon 8- and 6-ply variations of the 10-ply configuration.
Figure 2A:
FIG. 2A shows one master-ply stiffness component of all the sub-laminates within the double-double sub-laminate family.
Figure 2B:
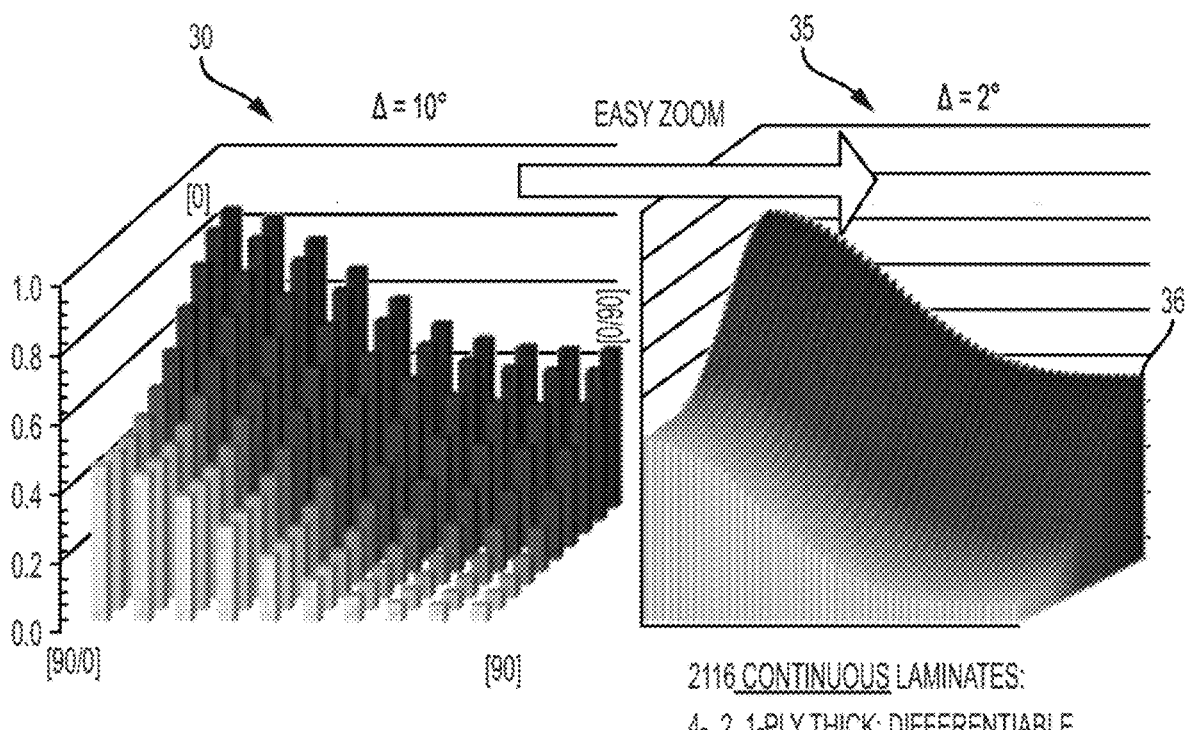
FIG. 2B shows two three-dimensional representations of the double-double sub-laminate family at angle increments of 10 and 2 degrees, respectively.

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not delimit the invention, except as outlined in the claims.

General Overview

As an initial matter, it is noted that various laminate structure (e.g., ply layers and/or sub-laminate modules) consolidation options exist, as are commonly known and understood in the art. Fabrics within the ply layers and/or the sub-laminate modules may be furnished as dry fibers or pre-impregnated with resin (e.g., prepreg). Non-limiting examples of each, as also commonly known and understood in the art, include the non-limiting examples of Resin Transfer Molding, Vacuum Resin Transfer Molding, Heated Vacuum Assist Resin Transfer Molding, out of Autoclave Processes, and Resin Film Infusion. In certain embodiments, the plies may be carbon fiber plies defined by or formed from a plurality of fibers. Still other embodiments may be alternatively configured with various materials (e.g., fiberglass or an electric conductor such as copper wire). As a non-limiting example, in the context of wind turbine blades, the laminate structures and/or sub-modules described herein may, instead of carbon fiber plies, incorporate fiberglass plies, as may be desirable for cost or other considerations, as the case may be. In still other embodiments, hybridization may be desirable, leading to a mixture of any of variety of combinations of carbon fiber, fiberglass, and/or periodically spaced electric conductor (e.g., copper wire, as lightning protection), or still other materials as ply layers.

As also alluded to elsewhere herein, one exemplary, non-limiting, and useful application of double-double sub-laminates lies in the construction of composite grids and/or composite grid and skin and/or grid/core/skin structures. Notably, with the material characteristics of—in particular homogenized—double-double sub-laminate structures, implementation of grid and skin and/or grid/core/skin-type structures is predictable and achievable; it is also made more efficient alongside optimizable and automated layup procedures that in a straightforward manner are able to create total laminates that are not only strong and lightweight, but also damage tolerant and inexpensive.

Conventional composite grid structures—typically multidirectional in nature—are generally designed to emulate the strength characteristics of conventional metal-based structural materials, and as such have been typically constrained to designs utilizing more than two ply layers or components. One such example, the Wellington fuselage (detailed further in WO 2018/187186) utilizes a grid that was made of aluminum and had a [±45] grid with a nominal [0] tie. One of the most important features of composite grids is the inherent damage tolerance. As one rib or joint is removed by external force or impact, the lattice structure with high density of intersection ribs will form a new network with little loss in the integrity of the entire grid structure. The survival of the Wellington bomber fuselage after battle damage is also a true testimony of this inherent damage tolerance. Notably, traditional laminates (skins without grids) are penalized by at least a factor of 2 for damage tolerance to guard against growth of micro cracking and delamination. Having grids as the backbone of a grid/skin construction is thus a game changing concept that permits fuller use of the intrinsic properties of composite materials.

Figure 3:
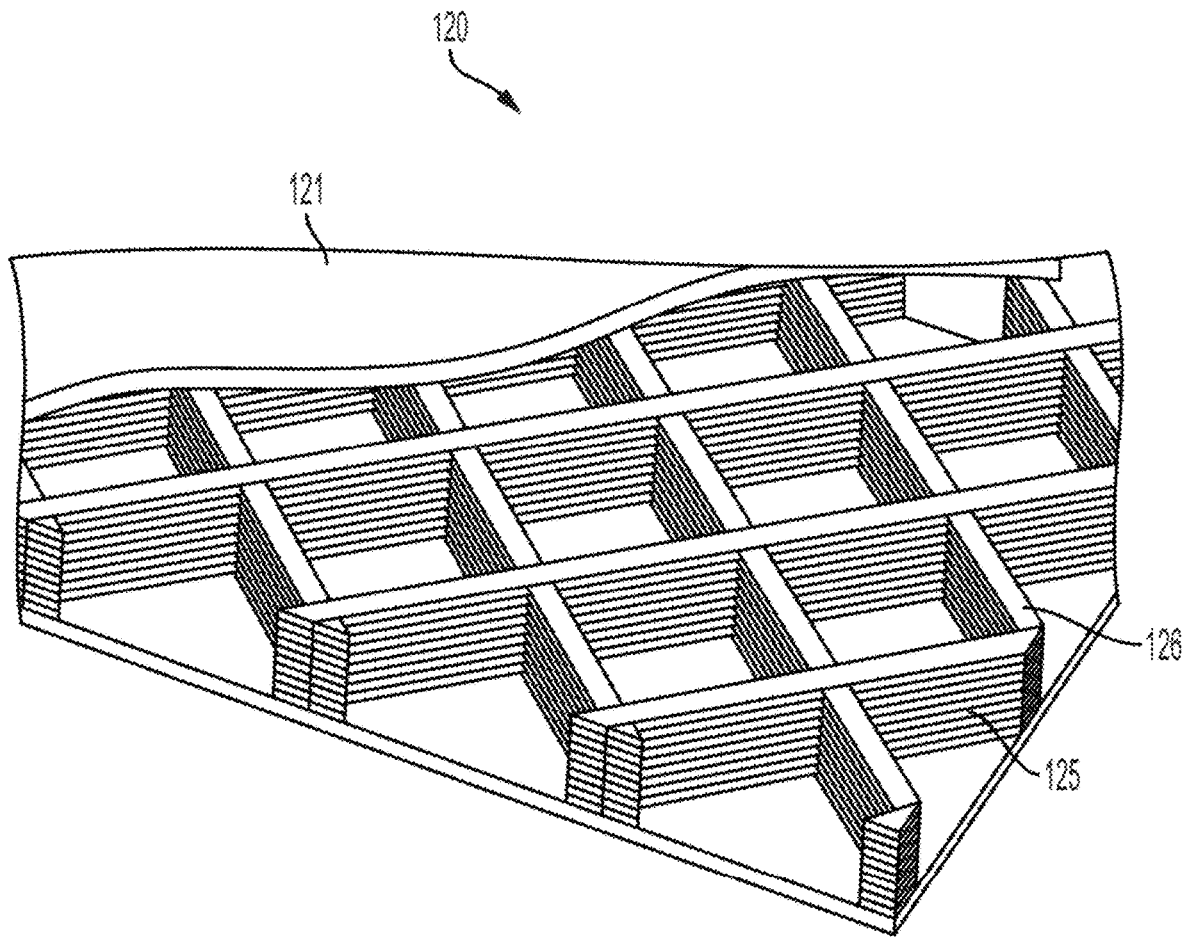
FIG. 3 shows a grid and skin construction formed using continuous tape and discontinuous inserts in accordance with established processes.

Recent advances in technology have also identified composite grids as providing an exceptionally light weight configuration and/or alternative to configurations such as those utilized in the Wellington fuselage. For example, unidirectional ribs can replace aluminum tri-ax grids. Still further, any of a variety of angles—both for the grid and the tie (or skin layer)—may be utilized where double-double sub-laminate structures are relied upon. This may be understood first with reference to FIG. 3, wherein a double skin grid structure 120 is illustrated. One double helix or sub-laminate [±A] is used to form each of the skin layer(s) 121 while another double helix or sub-laminate [±B] is used to form the grid 125, 126 components. In this manner a single double-double sub-laminate [±A/±B] may be utilized for any double skin/grid combination, provided both skins are oriented in the same manner, as detailed elsewhere herein. In certain embodiments, cross-laying of the sub-laminate [±B] may again achieve the multi-directional (i.e., diamond-like) pattern of the grid and the density thereof may vary according to various embodiments. Single or double skin grid structures 120 are also interchangeable dependent on application.

As mentioned, grid is a unique structure, at least due to its ability to have unidirectional composite form its ribs. Thus, the stiffness of a grid with such ribs may be many times stiffer than a grid made—for example—of aluminum. The reason for that is the ribs of an aluminum grid is the same aluminum stiffness at 70 GPa. For carbon composites, the rib stiffness can easily be 180 GPa. Still further, composite materials are generally 40 percent lighter than aluminum. Thus, together with higher stiffness and nearly one half the weight, a composite grid—formed by example from double-double sub-laminate material—may have 4 or 5 times the specific stiffness, as compared to conventional grid structures.

Figure 4:
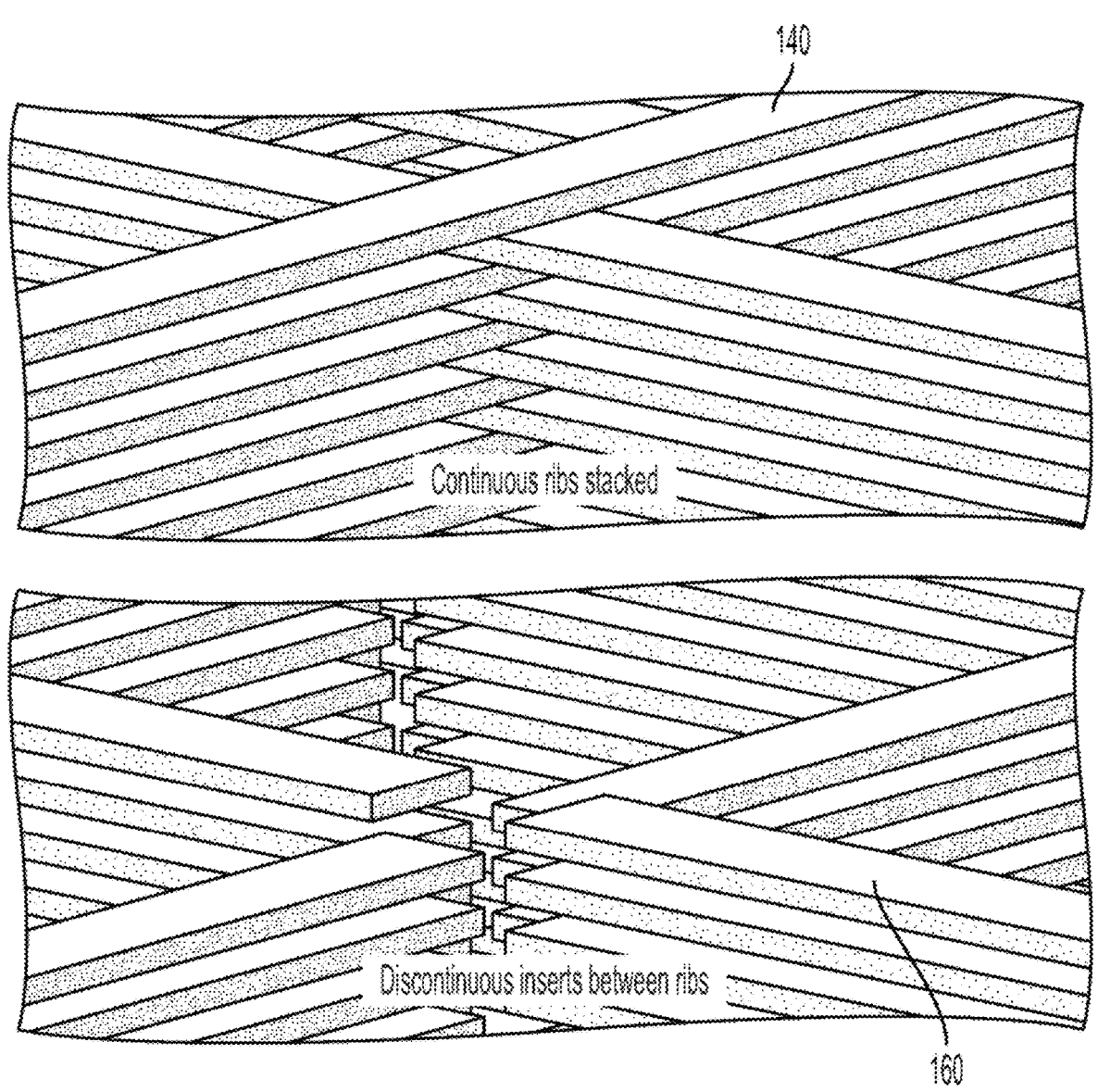
FIG. 4 shows the continuous ribs and discontinuous inserts of FIG. 3 in a stacked orientation, once more in accordance with established processes.

Reference is also made to FIG. 4, with citation also to U.S. Publication No. 2022/0242087, wherein a variation known is to form grid components from a combination of continuous tapes 125 and discontinuous inserts 126. This discontinuous insert configuration 160, as illustrated in the lower half of FIG. 4, may be compared with the continuous rib stacking configuration 140 previously known, exhibiting an even further exacerbated "traffic jam" of material at respective joints or nodes. The alternating of the tapes and inserts minimized this, while also eliminating discontinuities across layers, via alternating of tape placement and the like. Stated otherwise, to match the height of the ribs and their joints, the discontinuous inserts 126 (having a length of L−b (i.e., length of grid (L) minus width of tape 125 (b))) were added in every other layer of tape in the rib. Inefficiencies, however, remained, with some degree of weakness observed at joints; more notably, the manufacturing process was fairly complex and thus error prone.

The strength of composite grid structures defined with double-double sub-laminate materials also surpass that of aluminum grid by even a wider margin than stiffness, particularly when the "traffic jam" at joints or nodes of intersecting grid components is present. Thus, the well-known resistance to explosion of the Wellington bomber may be enhanced via utilization of the double-double sub-laminate materials in a grid-like construction with integrated joints or nodes, with greater anticipated effectiveness, simplicity, and ease of manufacture.

Metallic Grids

Figure 5A:
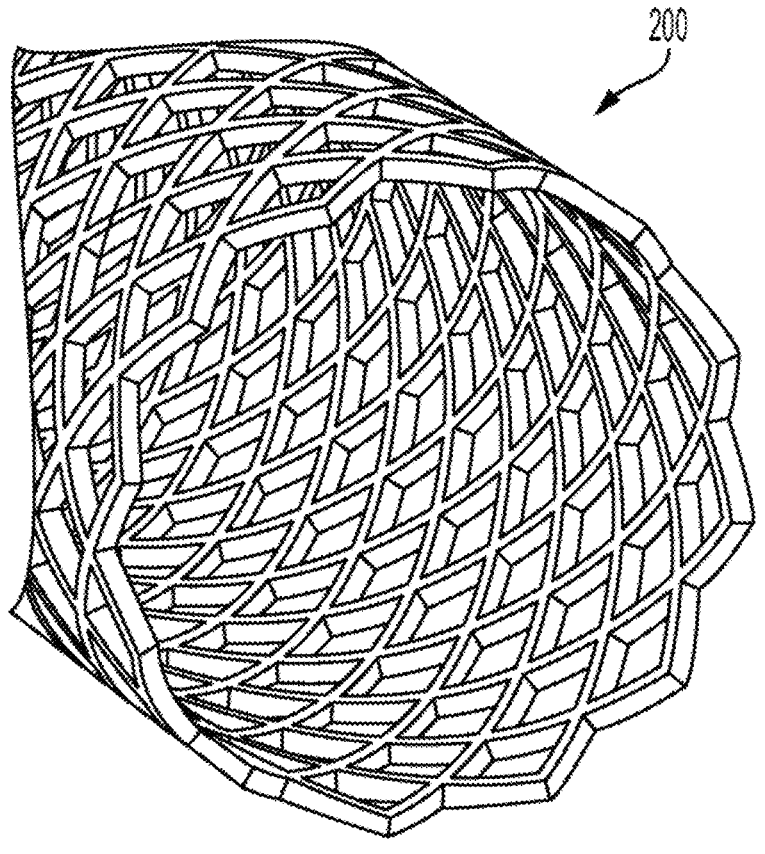
FIG. 5A shows an exemplary metallic grid configuration according to various embodiments.
Figure 5B:
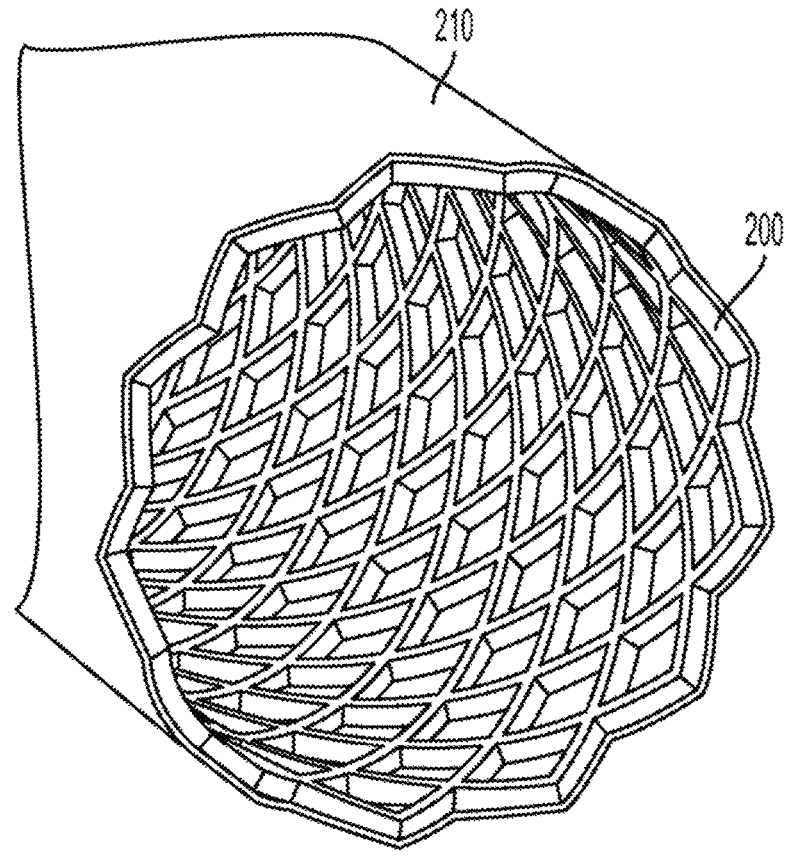
FIG. 5B shows an exemplary grid and skin assembly according to various embodiments.

Turning now to FIGS. 5A-B, an exemplary embodiment of a metallic grid 200 and grid and skin 210 assembly may be understood. It is well known that grid-stiffened cylinders are very efficient structures, which have a variety of applications in aerospace, transportation, and marine engineering. For fuselage, the grid 200 can be designed to include doors and windows. Same concept can be applied to box beams for wings, and full-depth grid for rotors and engine containment rings.

It is also well known that fiber-reinforced composites with a high specific stiffness and strength have the potential of reducing the structural weight. When grid-stiffened cylinders (see FIG. 5A) are manufactured by fibre-reinforced composites, the structural efficiency is significantly enhanced by fully taking advantage of the directional properties of composites. However, the manufacturing difficulty of the composite grids, which usually requires automated fibre placement machine or filament winding machine, largely hinder the adoption of the grid-stiffened concept. Nothing in the conventional design and manufacturing of grids is simple. Just the mold design, filling mold with fibers, matching between the height of ribs and joints such as the use of discontinuous inserts, bagging and pressurization during curing, demolding, machining, and joining to other parts of a component, and attaching one or two skins, and others are all difficult and have no simple solutions. These difficulties are the reasons why composites grid/skin construction has not been used in any mass-produced airplanes and other transportation systems.

To overcome certain of the challenges noted hereinabove, with reference again to FIGS. 5A-B, a hybridized metal grid 200 with a fiber-reinforced laminate skin 210 may be seen and understood. Ease of manufacturing is provided, along with the advantages described above, so as to take advantage of the mismatched thermal expansion of metal and composite to provide an ease and reliable assembly between the laminate skin 210 and metal grids 200. Amongst various exemplary advantages, the pre-pressure between the skin and grid can help to close the crack and prevent skin-stiffener departure during large deformation. Still further, tooling requirements for manufacturing complicated grids (e.g., non-uniformly distributed curved grids) is no longer an issue.

In certain embodiments, the material of the metal grid 200 may be a metal other than conventional aluminum. For example, the metal grid 200 may be one of stainless steel or titanium. One example of a titanium (alloy) grid with one or two composite skins can be very attractive. Radial expansion and corresponding deformation shapes reveal that a cylinder with the layup of $[\pm 60°]_{rN}$ (see also FIG. 11 and cylinder 300 illustrated therein) reaches the largest negative thermal expansion (NTE). At the same time, the NTE is observed to decrease with the layup orientation departing from ±60° and reaching positive values, in certain embodiments. Tables 1-2, below, provides further buckling and load modeling results for this exemplary titanium alloy grid under axial compression and bending, respectively.

TABLE 1

Buckling model and load factor ($\lambda/\lambda_{60}^{skin}$) comparison for a IM7/977 cylinder stiffened by a Titanium alloy grid under axial compression.

| | Skin | | | | | |
| | Skin outside | | Skin inside | | Sandwich grid | |
| Grid | [±30] | [±60] | [±30] | [±60] | [±30] | [±60] |
|---|---|---|---|---|---|---|
| 0°/90° | 1.06 | 1.02 | 1.09 | 1.36 | 0.50 | 0.50 |
| ±15° | 0.85 | 0.55 | 0.89 | 1.21 | 0.51 | 0.26 |
| ±30° | 0.92 | 1.00 | 1.01 | 1.21 | 0.67 | 0.54 |
| ±45° | 0.45 | 1.35 | 1.16 | 1.13 | 0.52 | 0.37 |
| ±60° | 0.23 | 0.55 | 0.95 | 0.88 | 0.62 | 0.53 |
| ±75° | 0.22 | 0.20 | 0.48 | 0.39 | 0.39 | 0.39 |
| Curved | 0.25 | 0.41 | 0.74 | 0.73 | 0.69 | 0.65 |

TABLE 2

Buckling model and load factor ($\lambda/\lambda_{60}^{skin}$) comparison for a IM7/977 cylinder stiffened by a Titanium alloy grid under bending.

| | Skin | | | | | |
| | Skin outside | | Skin inside | | Sandwich grid | |
| Grid | [±30] | [±60] | [±30] | [±60] | [±30] | [±60] |
|---|---|---|---|---|---|---|
| 0°/90° | 1.25 | 1.24 | 1.02 | 1.41 | 0.49 | 0.49 |
| ±15° | 1.01 | 0.68 | 0.91 | 1.36 | 0.53 | 0.25 |
| ±30° | 1.02 | 1.27 | 1.05 | 1.26 | 0.81 | 0.51 |
| ±45° | 0.53 | 1.46 | 1.20 | 1.19 | 0.49 | 0.39 |

TABLE 2-continued

Buckling model and load factor ($\lambda/\lambda_{60}^{skin}$) comparison for a IM7/977 cylinder stiffened by a Titanium alloy grid under bending.

| | Skin | | | | | |
|---|---|---|---|---|---|---|
| | Skin outside | | Skin inside | | Sandwich grid | |
| Grid | [±30] | [±60] | [±30] | [±60] | [±30] | [±60] |
| ±60° | 0.28 | 0.62 | 0.97 | 0.85 | 0.59 | 0.53 |
| ±75° | 0.24 | 0.23 | 0.49 | 0.39 | 0.38 | 0.40 |
| Curved | 0.69 | 1.19 | 1.46 | 0.91 | 2.67 | 1.56 |

From the above, it may be understood that hybrid grid-stiffened cylinders can reach a higher buckling load than the laminate skins with the same structural weight. At the same time, the grid embodiments described herein also provide a much higher damage tolerance than a plain laminate cylinder due to the redundancy of multiple intersecting ribs. From the comparison, it is observed that the hybrid grid-stiffened cylinders may undergo complicated buckling modes including cylindrical buckling, local skin buckling, local rib buckling, in-cell and cross-cell buckling, and buckling modes coupled between different scales. The buckling load factor not only depends on the grid angle, skin ply orientations, but also is related to the grid types selected. In the three different grid types, the sandwich grid is much weaker for local skin buckling due to the halved skin thickness to maintain the same structural weight.

Thus, it may be concluded that the sandwich grids have a much lower buckling load which buckles at local skin cells. For example, during all the simulations under axial compression and bending, the hybrid grid with $[\pm 60°]_{rN}$ laminate skin has the highest buckling load. This high buckling load is obtained by hybridizing a 0°/90° outside titanium grid or a ±45° inside grid, which are highlighted in the Tables. Thus, in this specific case of using straight grids, the proposed hybrid grid-stiffened cylinders are more efficient than sandwich grid for buckling resistance. However, the following-up investigation shows that curved grids may largely enhance the buckling resistance of sandwich grids and make them achieve a much higher buckling load than one side skin grids.

Figure 10:
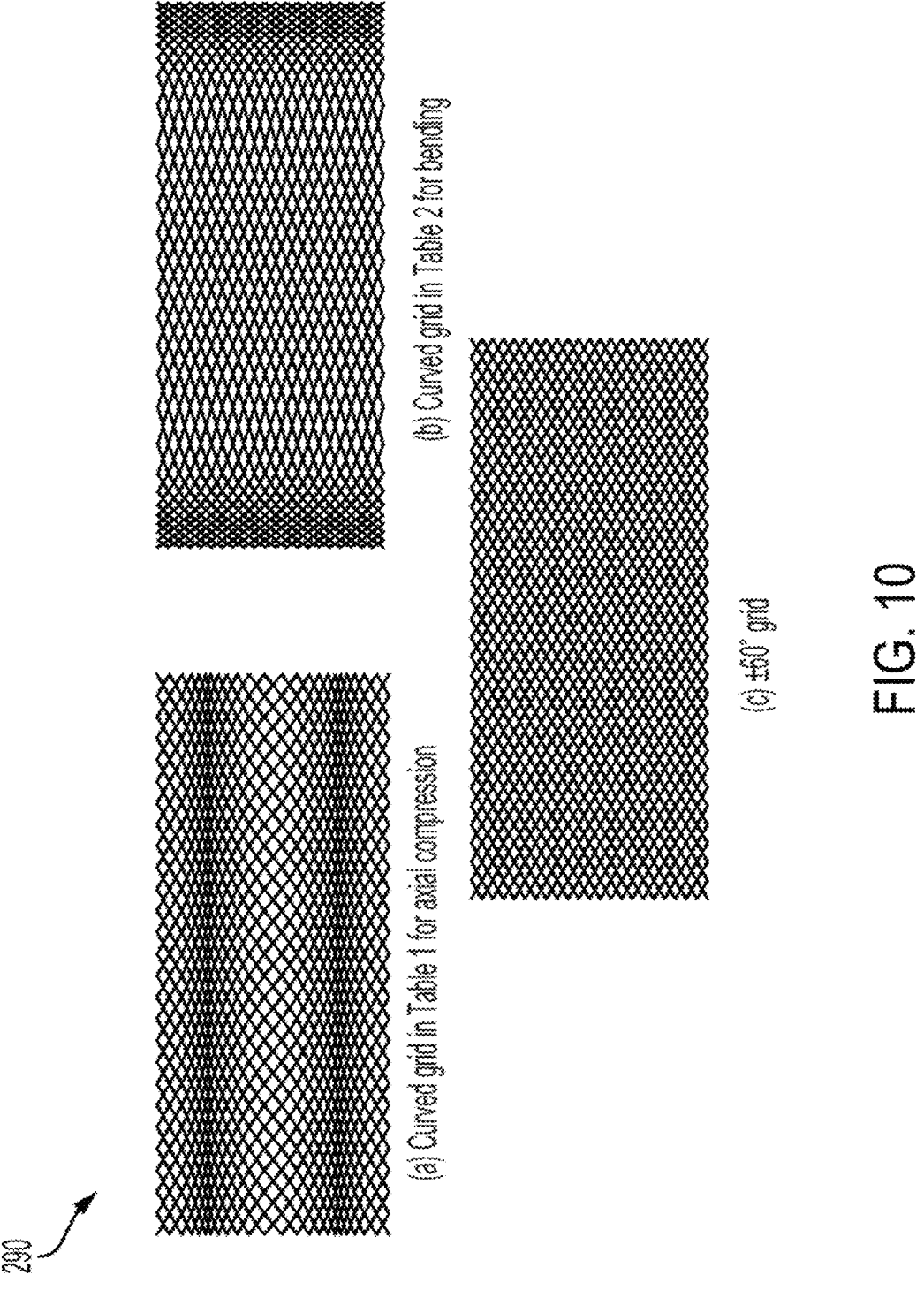
FIG. 10 shows still further exemplary variations in the curvature and/or fiber layering of the grid and/or skin components according to various embodiments.

One notable but non-exemplary advantage of using a metal grid 200 is the big potential of optimizing the rib pattern with a small amount of manufacturing limitation due to mature multiple manufacturing techniques of metals. Two different curved grid patterns for axial compression and bending are included in Table 1-2 (see above). Meanwhile, the expanded view along the circumferential direction of the curved grid patterns in Tables 1-2 is illustrated in FIG. 10. The curved grid also maintains the same structural weight as that of the straight grid, also equals to the benchmark weight of a solid laminate. From Table 2, it is shown that curved grids help to redistribute the load and effectively avoid local skin buckling for sandwich grid. The buckling load is 170% higher than the benchmark solid laminate skin with the layup of $[\pm 60°]_{rN}$ and 82% higher than the largest buckling load obtained for using straight grids. At the same time, an improper curved grid may aggravate local buckling and lead to an extremely low buckling load, as shown in Table 1 using the curved grid pattern illustrated in FIG. 10(a) under axial compression. It is noticeable that these curved grid patterns are not obtained from optimization. Advanced structural optimization techniques are required to effectively achieve optimal grid layouts, skin layups, and grid sizing for structural performance enhancement.

Figure 6:
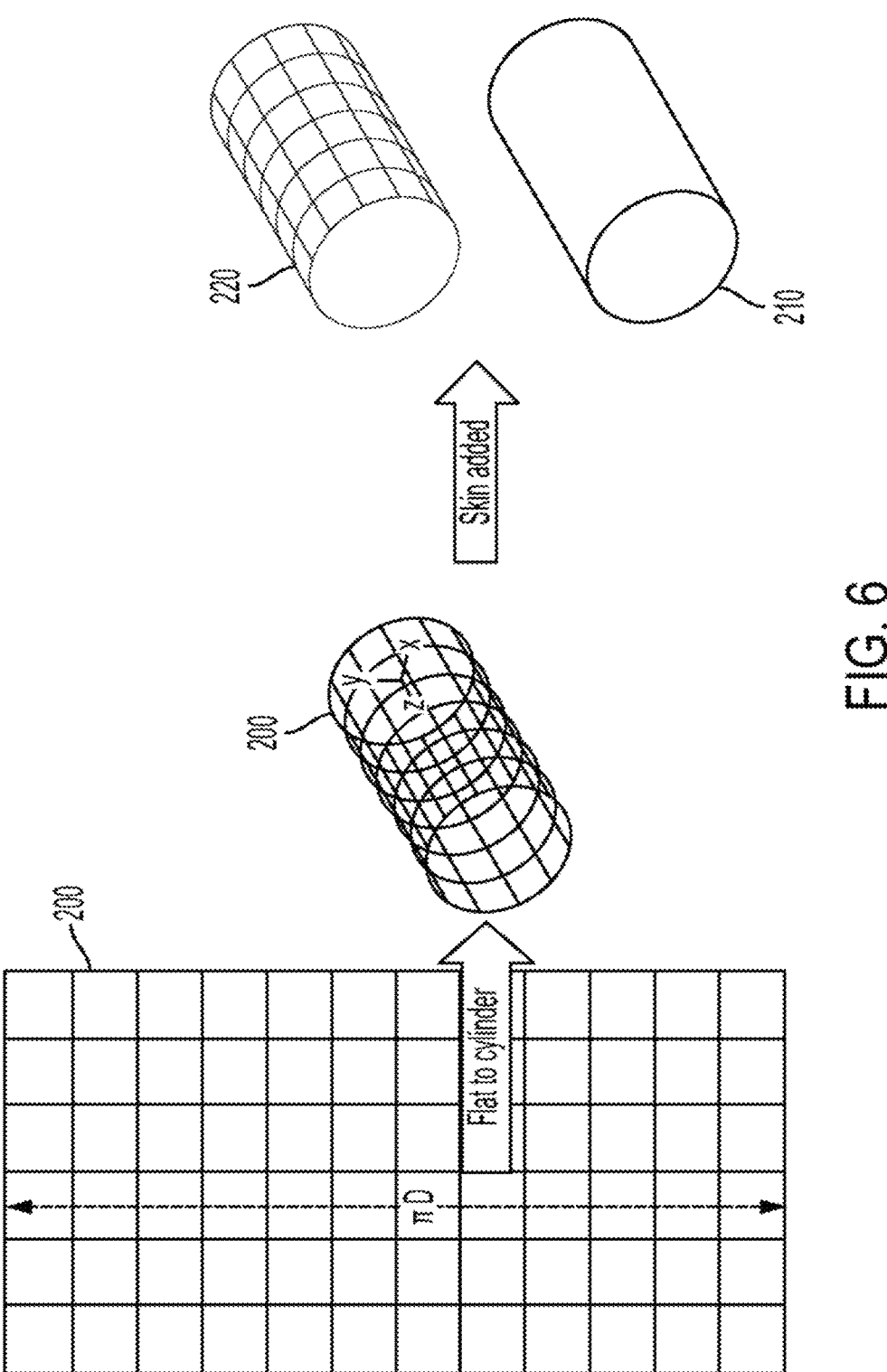
FIG. 6 shows an exemplary manufacturing procedure for the grid and/or skin assembly of FIGS. 5A-B.

Reference is thus also made to FIG. 6, illustrating an exemplary manufacturing process for the skin 210 and grid 200 combination(s) contemplated and/or described above. The process starts with a flat plate, uses water jet (or the like) to remove metals so the desired rib network can be made, rolls the grid 200 from flat to circular shape, and end welds the same to form a complete cylinder. Skeletons thus look like that of the conventional Wellington bomber, but with improved structural characteristics. Still further, so constructed, a skin 210 may be added to form a combined grid/skin assembly 220, as also illustrated in FIG. 6.

Figure 7A:
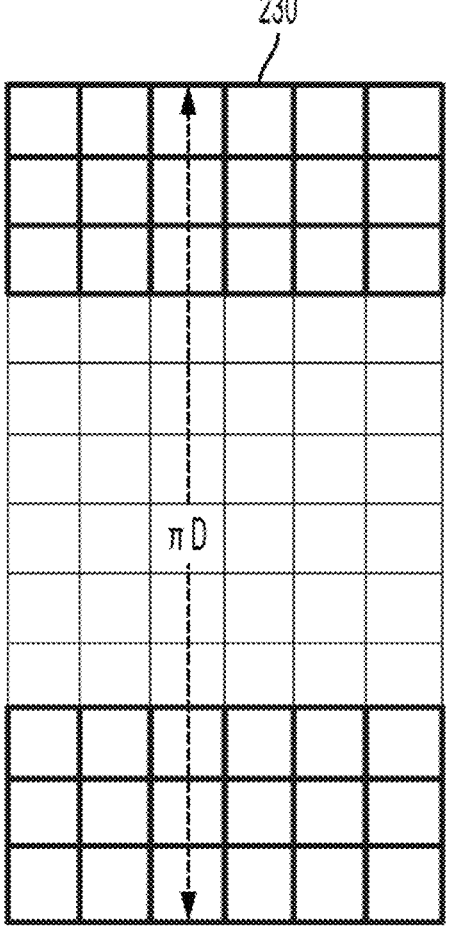
FIGS. 7A-B show exemplary variations to the grid of the exemplary embodiments of FIGS. 5A-B, further according to various embodiments.
Figure 7B:
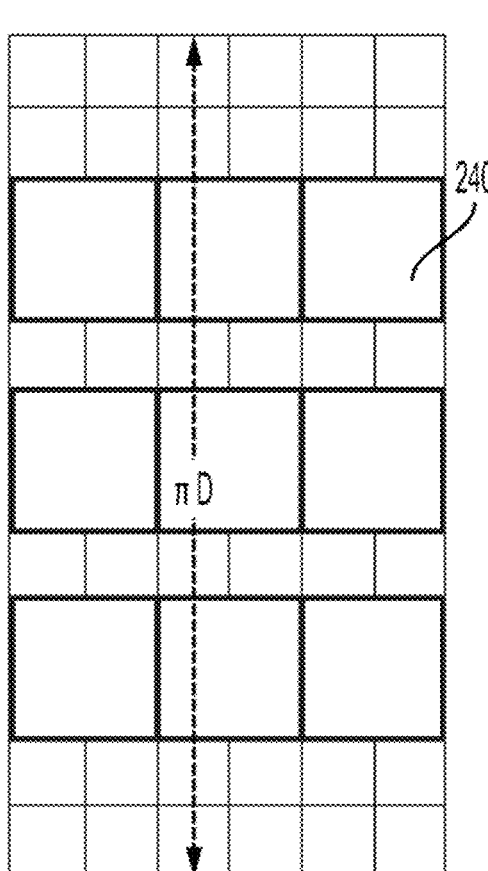
Figure 9:
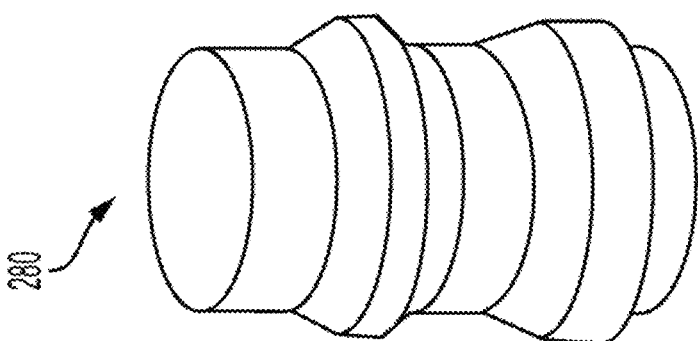
FIG. 9 shows still further exemplary variations in the structure of the grid and skin components according to various embodiments.
Figure 9:
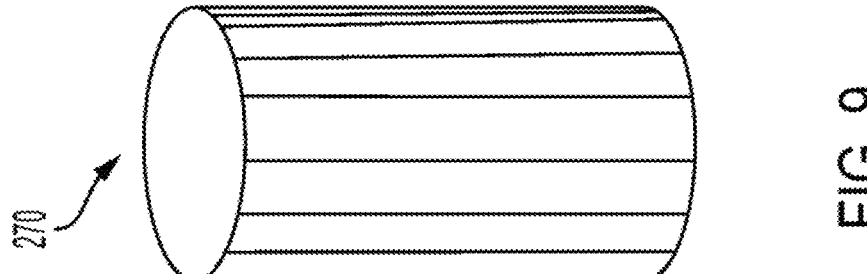
Figure 9:
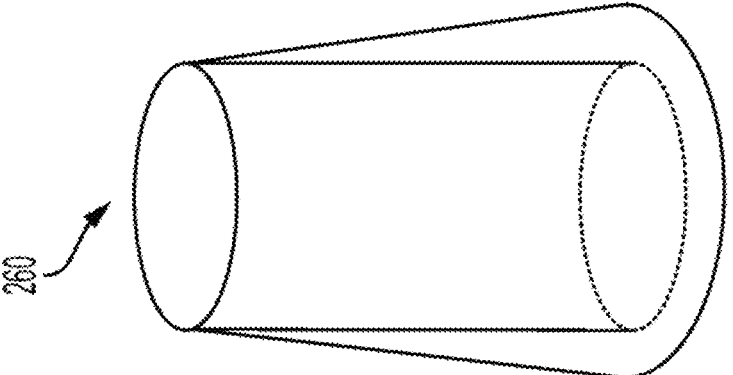

With reference to FIGS. 7A-B, it may be understood that according to various embodiments the grid/skin assembly 220 may incorporate variations therein. In FIG. 7A, deviations in relative thickness of certain rib portions 230 may be provided; this may be compared to and/or combined with variations in rib portion defining grid sizes 240, as illustrated in FIG. 7B. In these and other variations, accommodations may be thus made for various shapes, as illustrated in FIG. 9, whether for cross-section adaptations 260, longitudinal patches 270, or complex patches 280. In the case of each of these (and other) variations, via the embodiments described herein, the modulus may remain constant, and manufacturing may be via simple cylindrical mandrels.

Figure 8:
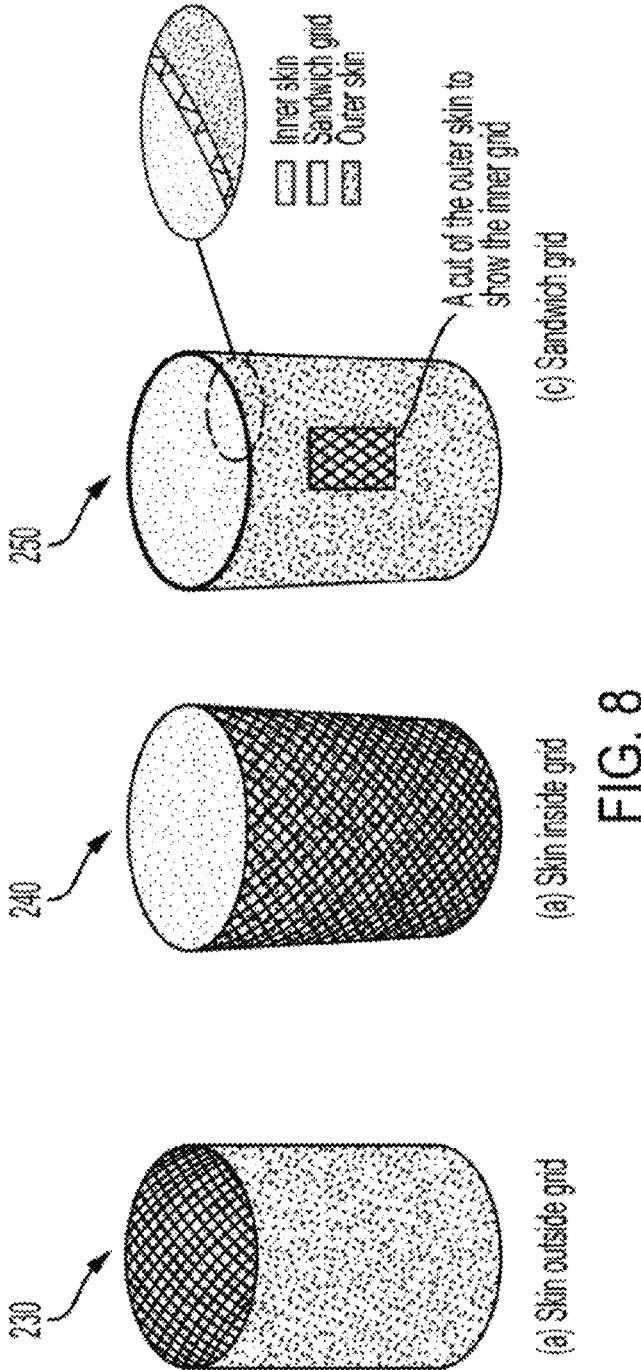
FIG. 8 shows still further exemplary variations in the layer of the grid and skin components according to various embodiments.

From FIG. 8, still further variations may be understood, whereby the grid 200 may be combined with a skin 210 in a manner such that the skin is outward facing in configuration 230. Another option may be for inward facing skin in configuration 240. Yet another variation involves a sandwiched grid 200, in between two distinct skins 210, forming a dual-skinned configuration 250. These and still other variations may have usefulness for certain applications; it should be understood that in each, a hybrid type construction of the grid (metallic) and skin (non-metallic, composite laminate construction) will be employed.

Figure 11:
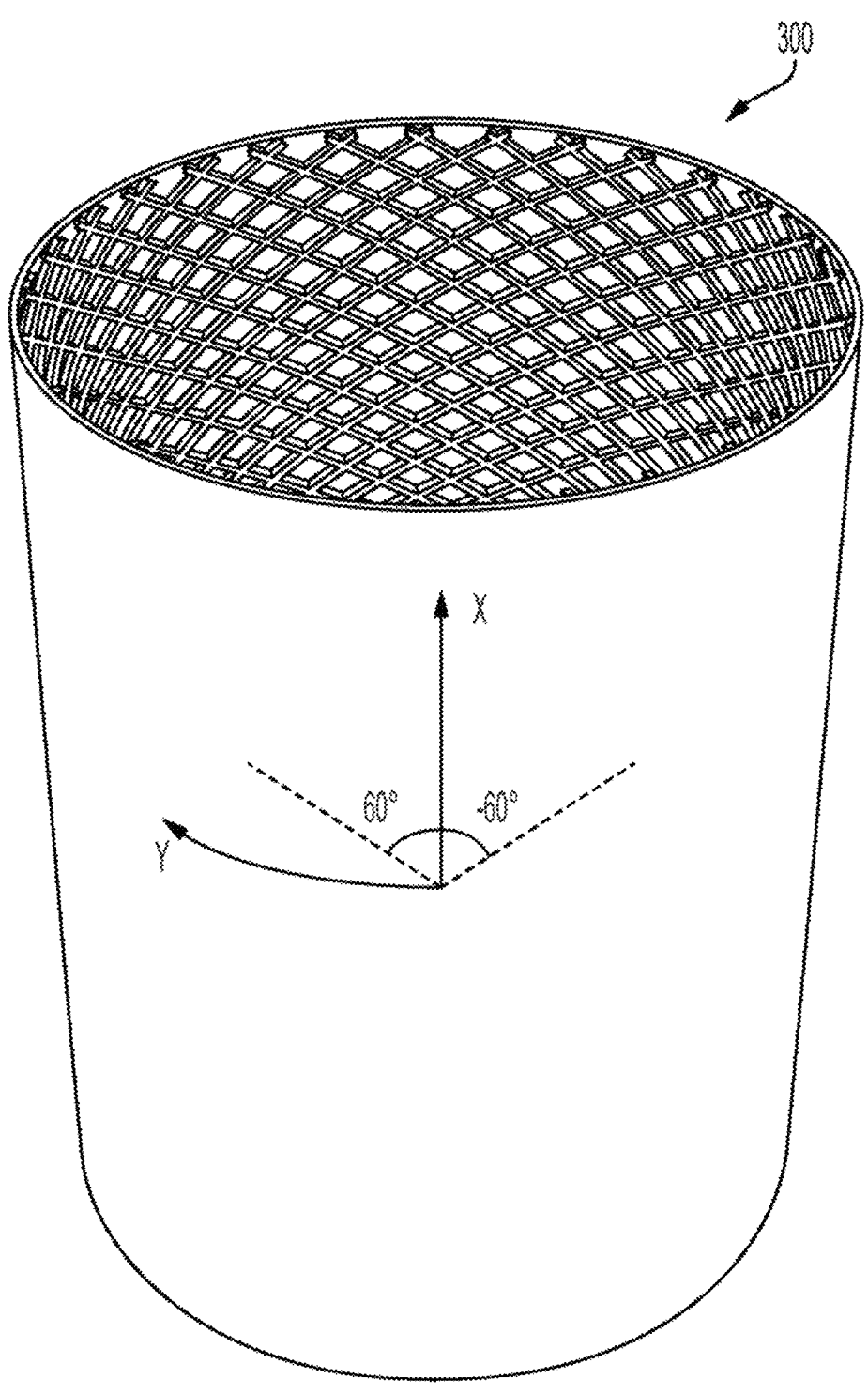
FIG. 11 shows an exemplary 60-degree orientation for a grid and skin assembly according to various embodiments.
Figure 12:
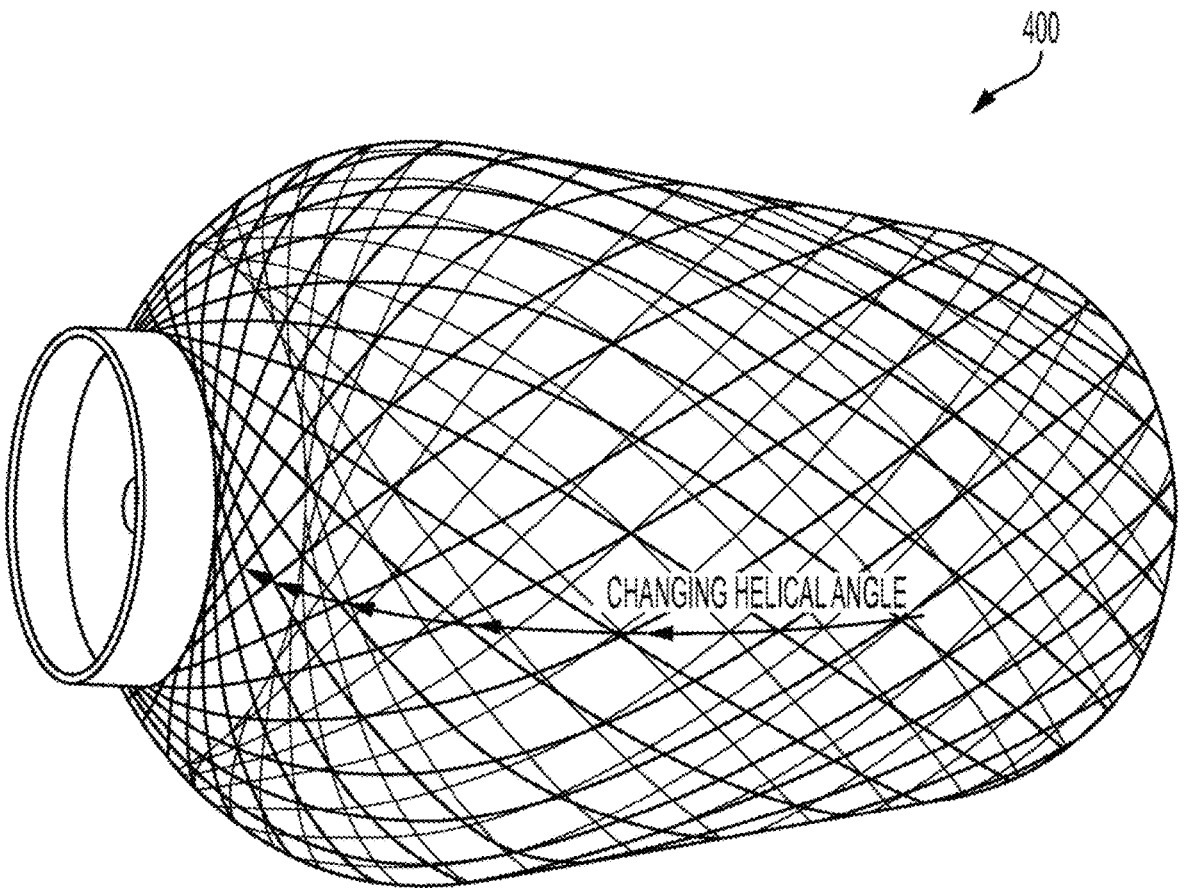
FIG. 12 shows an exemplary application of a grid and skin assembly with a changing or variable helical angle for all-hoop or helical winding layup processes.

Returning to FIGS. 10 and 11, both previously mentioned herein, it should be understood that the grid 200 and skin 210 options described herein may be curved and/or oriented at offset angles relative to one another. These may be opposing angles (+/−) or otherwise, so as to define curved grids associated with Table 1 (for axial compression; see also FIG. 10(a) and/or Table 2 (for bending; see also FIG. 10(b))). A range of offset acute angles may be provided and envisioned, including ranging from 20 to 70 degrees; for example, 25 or 30 or 35 degrees; even 60 degrees, the latter as illustrated in FIG. 11 specifically. Such offset angles may also be variable, as illustrated in FIG. 12, for formation of complex three-dimensional and/or helical structures 400.

Returning once more to FIGS. 7A-B and the variations described previously herein, it should be understood that the water jet (or the like) formation of the metallic grid components contributes significantly to the ease of manufacturing of these elements. Indeed, so configured, metallic grid components may be manufactured with no tooling required, minimizing substantially complexities of layup, curing and/or demolding. Fast, accurate, automated, and robust manufacturing may thus be achieved via processes such as water jet cutting or the like. Water jet-based processes also facilitate variations, such as variable grid pattern and/or variation in grid thickness and/or other dimensional characteristics. In each of these and additional embodiments, once again with reference to FIG. 6, it may be understood that metal may be removed from a flat plate, with the resulting structure rolled into a finished grid of desired circular, non-circular, and/or other three-dimensional curvature structures. This configuration also facilitates glueless assembly and non-glued components, as described in further detail elsewhere herein.

Figure 13:
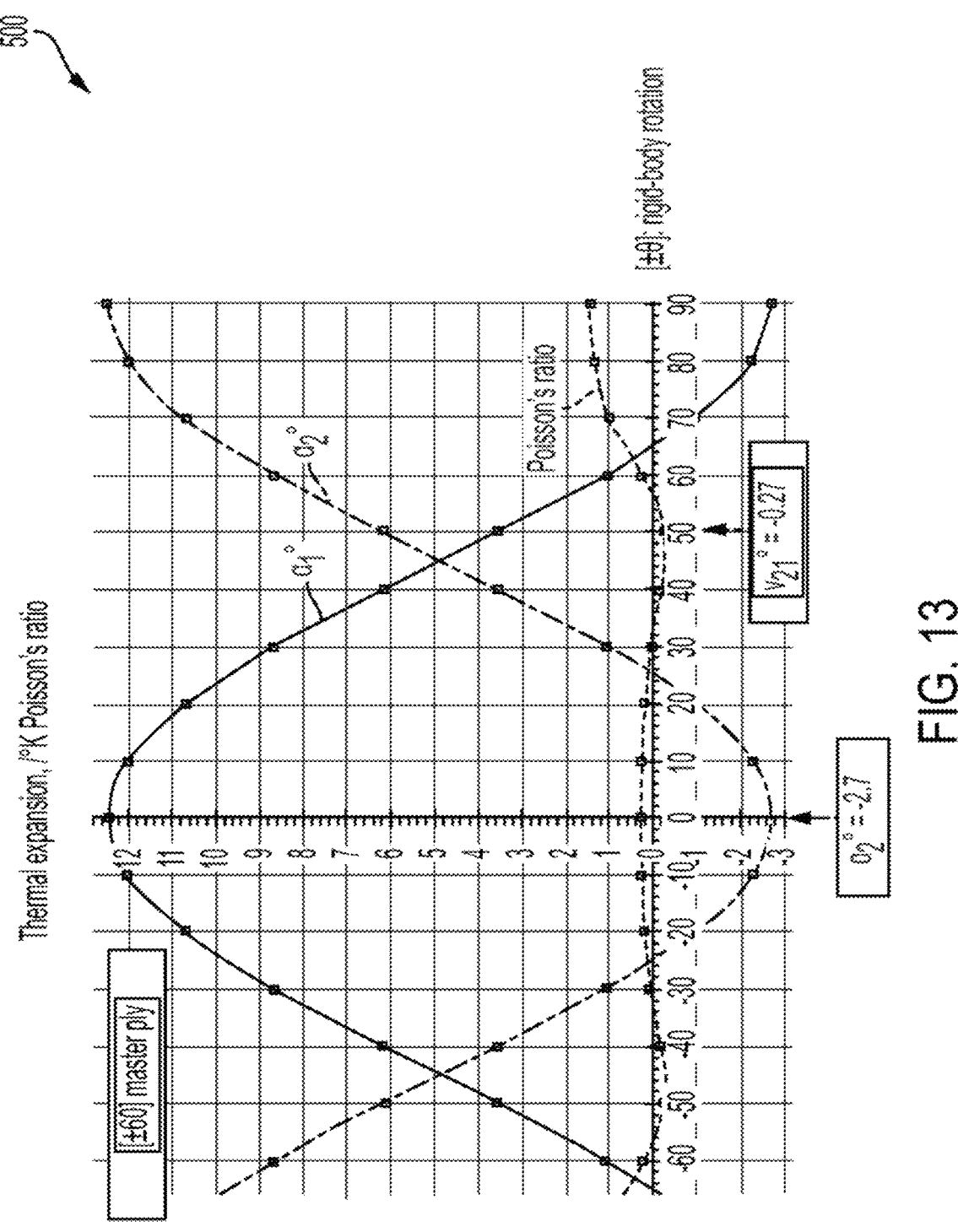
FIG. 13 is a chart showing thermal expansion characteristics of the grid and skin assembly according to various embodiments.
Figure 14:
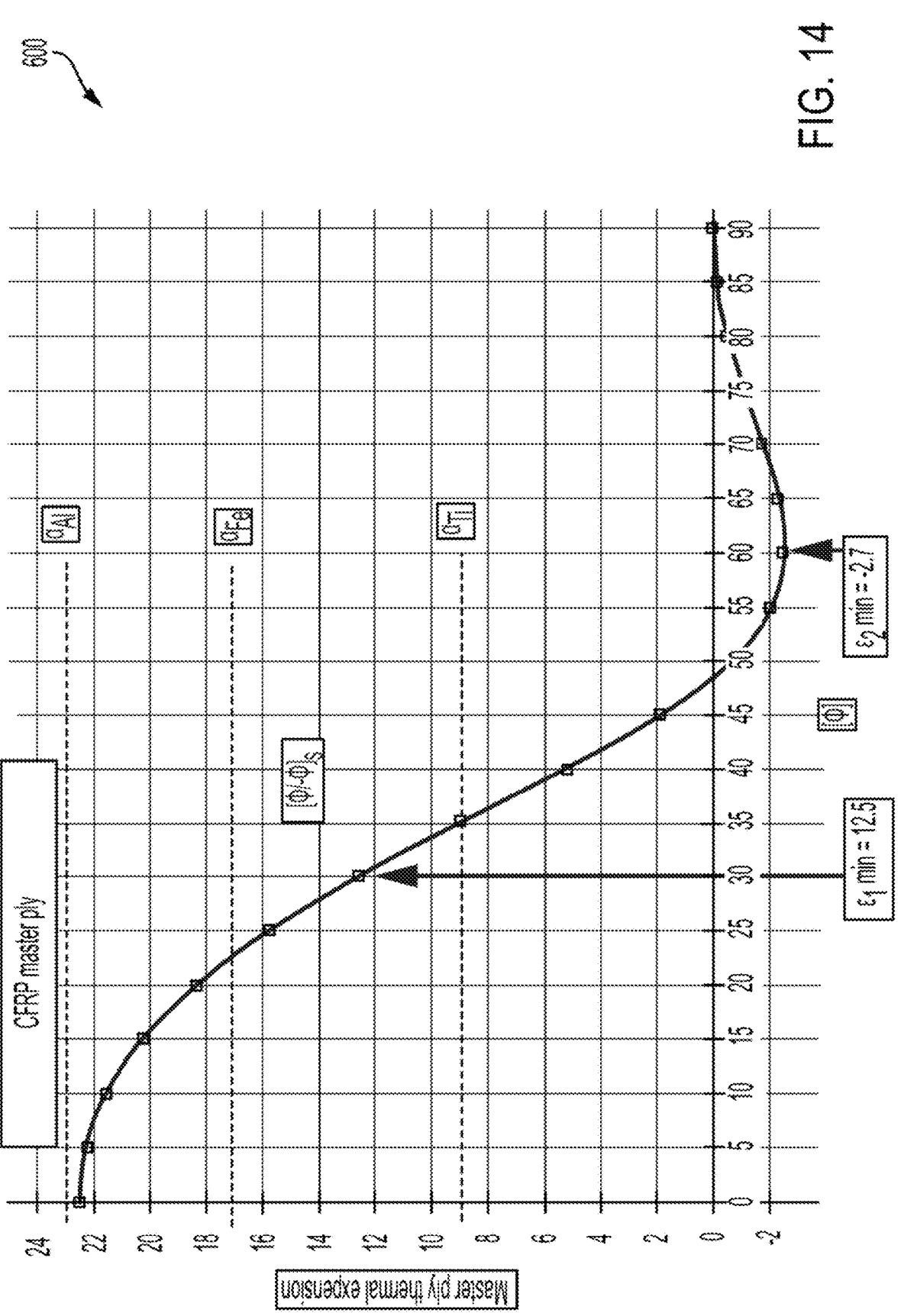
FIG. 14 is a chart showing thermal expansion characteristics of play-based grid and/or skin components according to various embodiments.

Remaining and exemplary challenges remain, however, including the logistics of handling of heated and/or chilled grid and/or skin assemblies. Variations of cross-sections, which must be either constant or conical presently; it is envisioned that unrestricted variations may also be possible, though. Acknowledged as well is that metals are not as efficient a grid material as composites, at least because the rib stiffness is the same as its base material, versus with composites this may be intentionally adjustable and/or variable based upon relative orientations selected. Notwithstanding, the advantages of utilizing a metallic grid, combined with a composite laminate structure skin(s) or alone, include those outlined herein. While aluminum is less than ideal due to corrosive and other constraints, the utilization of stainless steel and/or titanium achieves various of the advantages described herein. Specifically, titanium has the lowest thermal expansion (see thermal expansion tables 500-600 of FIGS. 13-14) making glueless assembly more difficult; while stainless steel is more desirable, particularly for glueless joint construction, as detailed herein below.

Glueless Joint Constructions

Reference is now made to FIGS. 16A-B and 17A-B, illustrating various embodiments of glueless joint constructions, as may be utilized in any of the grid 200-based configurations described previously herein.

Figure 15A:
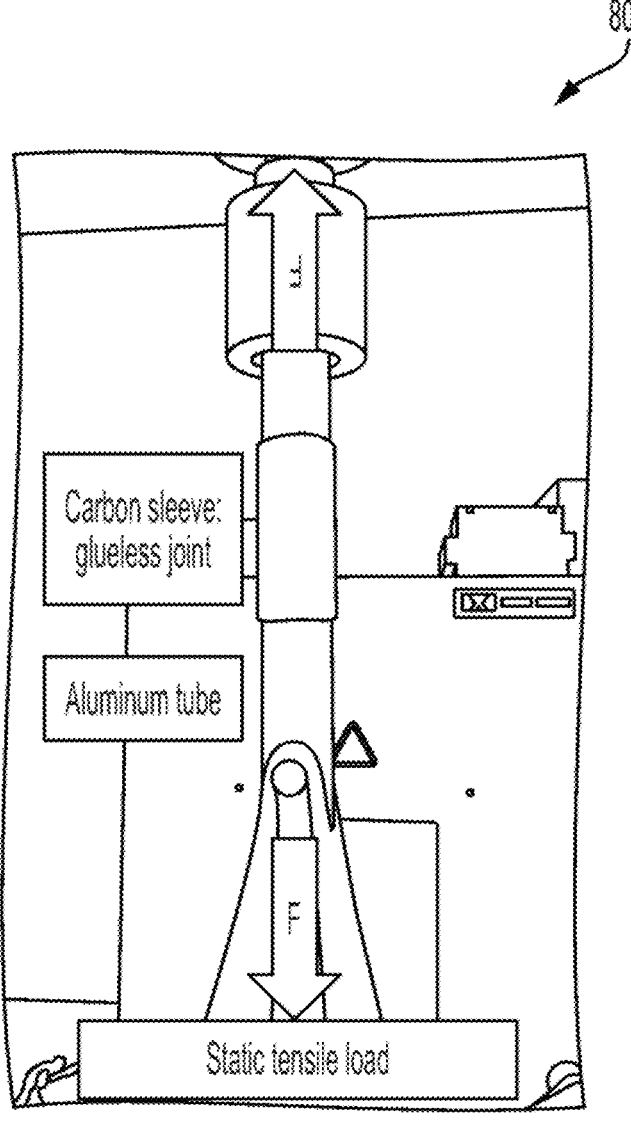
FIGS. 15A-B illustrate an exemplary glueless joint uniaxial test set-up and observed load characteristics thereof according to various embodiments.

In an exemplary embodiment, a two-inch CFRP sleeve is provided, which joints two four-inch-long tubes, to form an in-total eight-inch-long tube structure 800. (see FIGS. 15A-B in particular). For glueless joint construction, all components may be chilled using liquid nitrogen, as a result of which the metallic component(s) shrink and the composite sleeve expands. This results in a glueless assembly, with the metallic tubes inserted into the composite sleeve. Exemplary manufacturing processes may then involve returning the completed assembly to room temperature, under which condition the metallic component will expand and the composite sleeve will shrink, hence forming a tight fit. This process is, notably, reversible.

For example, conducted tests, respective holes were formed in the metallic components (whether aluminum, titanium, and/or stainless steel) and a static tensile load of 50 lbs was applied to the structure, for example by hanging 50 lbs of sandbags and and/or iron weights or the like on the assembly. The glueless sleeve joint held the 50 lbs without any deformation. Subsequent testing involved a uniaxial tensile pulling test was performed using INSTRON load frame, with Digital Image Correlation (DIC) applied, at a crosshead extension rate of 1 mm/min. The tensile result is shown in chart 810 of FIG. 15B. Of note, the ultimate load from the tensile pulling test was 508.9 N (114.4 lbf) and the average stress was 18.2 lbf/in^2, calculated by dividing the ultimate load by the total contact area between the CFRP sleeve and the two aluminum tubes.

Figure 15B:
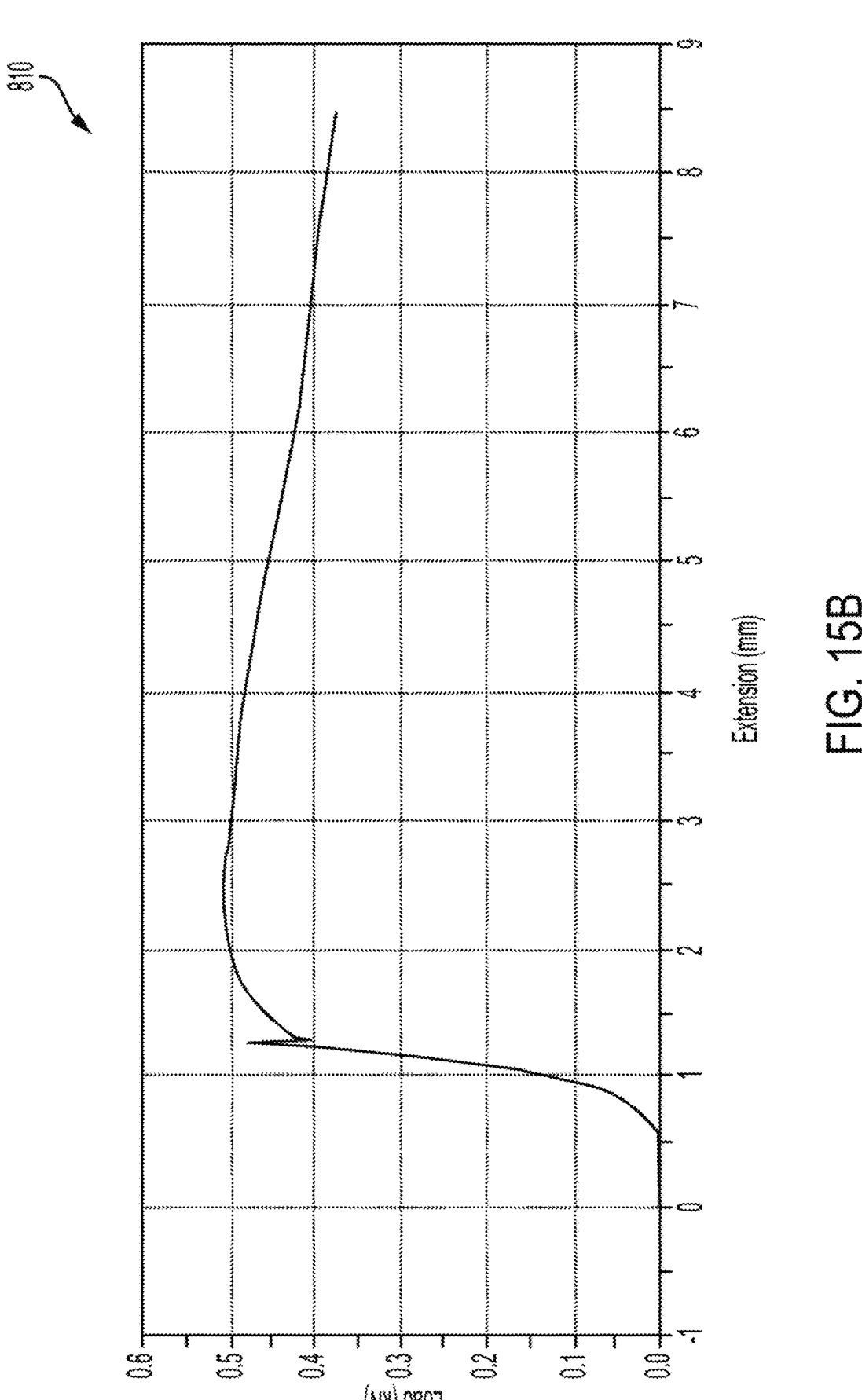
Figure 16A:
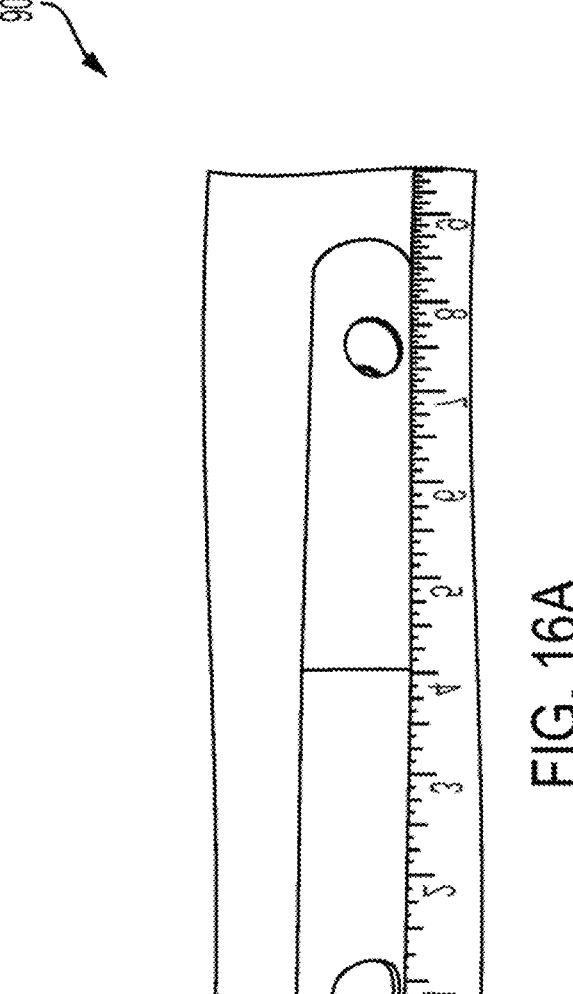
FIGS. 16A-B illustrate another exemplary glueless joint and observed load characteristics thereof according to various embodiments.
Figure 16B:
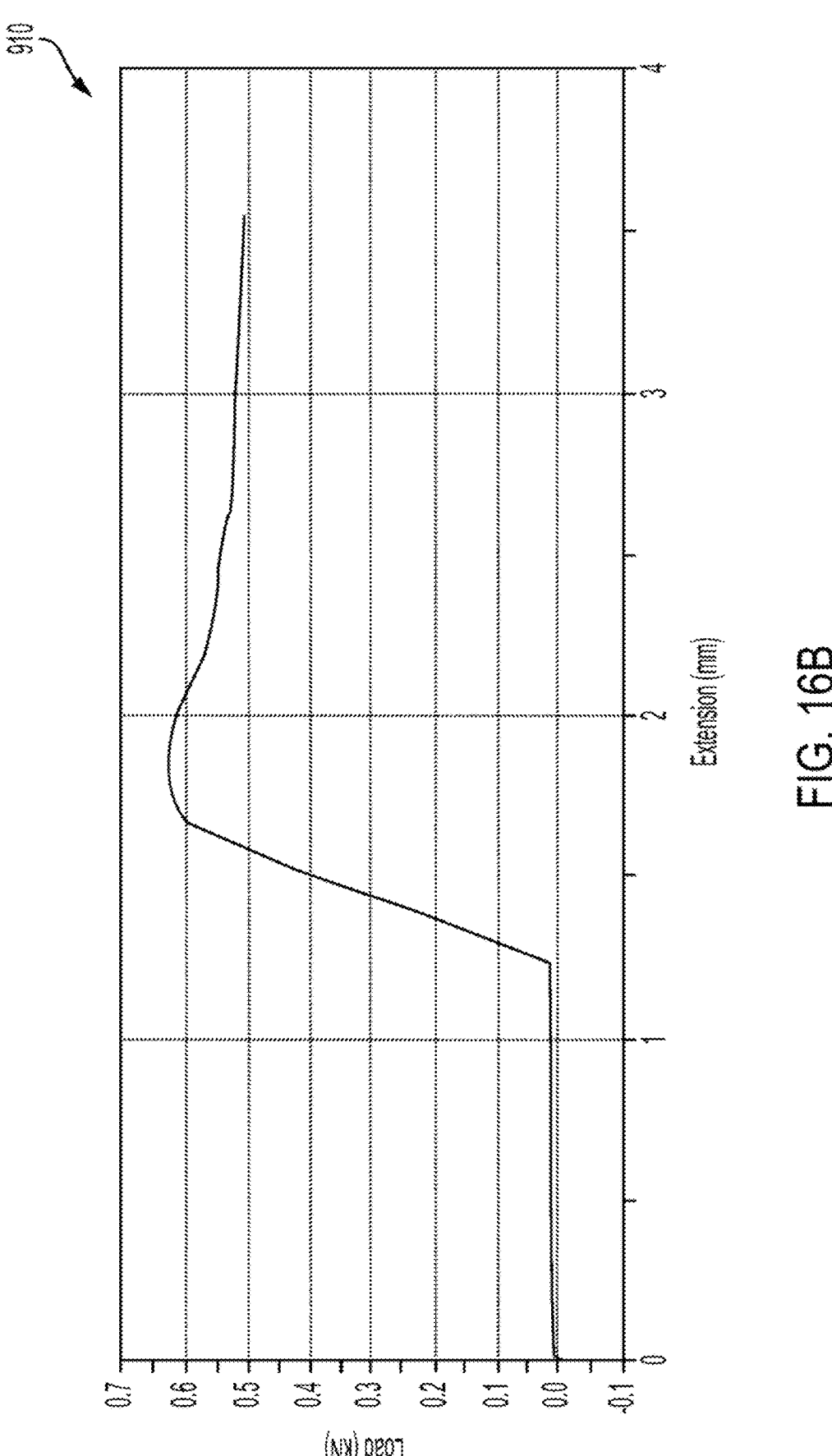

The results of FIG. 15B, notably in the context of aluminum tubes—versus the titanium and/or stainless-steel optimized grids 200 described herein—may be compared with the configuration and charted results of FIGS. 16A-B. Therein, one CFRP plug (4" in length, ~1" in width, ~0.3" in thickness, of composite laminate structure with +/−60 degree fiber plies) joins two four-inch long tubes, again to form an in-total eight-inch-long tube structure 900, as illustrated in FIG. 16A particularly. Under exemplary tests, all components were heated in an oven to the temperature of 500 C; as a result, the metallic component expanded and the CFRP composite plug shrank, forming a glueless assembly by inserting the CFRP plug into the metallic tubes. The completed structure was then returned to room temperature so the metal would shrink, and CFRP composite plug would expand, once more forming a tight fit in another reversible procedure.

Once more, remaining with FIGS. 16A-B, a static tensile load of 50 lbs was applied to the structure 900, for example by hanging 50 lbs of sandbags and and/or iron weights or the like on the assembly. The glueless sleeve joint held the 50 lbs without any deformation. Subsequent testing involved a uniaxial tensile pulling test was performed using INSTRON load frame, with Digital Image Correlation (DIC) applied, at a crosshead extension rate of 1 mm/min. The tensile result is shown in chart 910 of FIG. 16B. Of note, the ultimate load from the tensile pulling test was 628.3 N (141.2 lbf), an increase as compared to the results shown in chart 810 of FIG. 15B.

Additional Variations

Various embodiments described herein may also be available or provided in kit-form, such that the innovative joint(s) can be assembled post-manufacturing and/or distribution thereof. Such kits may have two pieces of aluminum tubing and one composite sleeve. Users can chill all three components (e.g., in a freezer for 10 minutes or an otherwise desirable period). Post-chilling the joint may be assembled by putting the sleeve over the aluminum tubes (i.e., an external sleeve) and thereafter letting the components return to room temperature. Disassembly of the two joined aluminum tubes is not possible unless the process is reversed by re-chilling the tubes to alter the material characteristics thereof.

For an internal sleeve (or plug), the three components may be heated and assembled relative to one another when they are hot. When the assembly is cooled to or permitted to return to room temperature an un-separable and bolt-/glueless joined assembly is achieved. In this context and otherwise, carbon/epoxy composite laminates are considered advantageous with respect to the desired negative thermal expansion along one specific axis. In this context and otherwise, the orientation of the sleeve/plug laminate may be [±60], although other orientations are possible.

Further exemplary and non-limiting applications and advantages achieved via the present invention include at least:

Glueless joints require two components with as wide in their thermal expansions as possible. Carbon composite laminates can have low TE as well as negative TE when the angles of a single-double laminate is around ±60 degree. As an example, in the facilitated glueless joint, aluminum has the highest TE at 22/° C. while steel is 14, and titanium is 10. The TE of [±60] along the 0-degree axis is 12 (it is negative in the 90-degree axis). That matches steel better than both aluminum and titanium. Thus, as one advantageous consideration, the thermal mismatch along the axis of the tube/cylinder to be joined is the smallest. Further, all three metals have the same stiffness to weight ratio; as a result, in terms of weight of the structures such as the grid, there is little difference between these three metals in their weight savings or penalty.

For glueless joints, the structure is preferably formed in a cylinder, although other structures may also be employed. For cylinders, the cross section can be circular, elliptical, rectangular. or square, listed as non-limiting examples. The cylinder may preferably be closed so that it will hold the pre-stress from the thermal expansion mismatch between the metallic grid and carbon skin. Such examples have been cited in pipes, pressure vessels, fuselage, box beams. Other applications include adapters between rockets with different diameters. In many applications weight savings may be secondary as compared with ease and speed of production, and their glueless joints. The grid/skin combination may also, in certain embodiments, provide superior damage tolerance that pure carbon composites cannot match. The extra safety factor added to carbon composites can be reduced to offset some the of extra weight resulting from the use of metals in the grid.

Another important consideration is that the change in diameters of the grid must be monotonic (continuously increasing or decreasing). This ensures that the skin can be inserted to the inside or outside of the grid. Inflection in grid diameters, according to certain embodiments, may prevent easy insertion of the skin into the grid.

Also, the role of metal and carbon composite can be reversed. A glueless joint can be made with a metallic sleeve or plus with composite pipe, pressure vessel, and fuselage. In these cases, composites are cylinders can be with or without sandwich core, but not likely to be a grid.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A grid and skin assembly for use in a composite laminate structure, the assembly comprising:
   a metallic grid having a plurality of intersecting ribs oriented in at least two distinct rib directions offset at a first variable angle relative to one another and defining respective intersection points; and
   a composite laminate skin having a plurality of ply layers comprising a plurality of tapes oriented in at least two distinct tape directions offset at a second angle relative to one another,
   wherein:
      the first variable angle is present in two or more distinct values lying in a range between 25 and 60 degrees;
      the intersection points define glueless joints of the metallic grid; and
      the metallic grid is a non-aluminum-based material.

2. The grid and skin assembly of claim 1, wherein the metallic grid is stainless steel.

3. The grid and skin assembly of claim 1, wherein the metallic grid is titanium.

4. The grid and skin assembly of claim 1, wherein the metallic grid is formed via a water jet cutting procedure.

5. The grid and skin assembly of claim 1, wherein the first and second angles are different relative to one another.

6. The grid and skin assembly of claim 1, wherein the plurality of intersecting ribs of the metallic grid are uniformly spaced to define a uniform pattern across substantially an entirety of a surface area of the metallic grid.

7. The grid and skin assembly of claim 1, wherein at least one subset of the plurality of intersecting ribs of the metallic grid are non-uniformly spaced to define a variable pattern on the surface area of the metallic grid.

8. The grid and skin assembly of claim 7, wherein a spacing between the at least one subset of the plurality of intersecting ribs is approximately double a spacing between the remainder of the plurality of interesting ribs.

9. The grid and skin assembly of claim 7, wherein variations in the spacing are non-uniformly distributed on the surface area of the metallic grid.

10. The grid and skin assembly of claim 1, wherein the first variable angle is no more than 35 degrees.

11. A metallic grid structure for use in a composite laminate structure, the grid structure comprising:
   a seamless metallic grid having a plurality of intersecting ribs oriented in at least two distinct rib directions offset at a variable angle relative to one another and defining respective intersection points,
   wherein:
      the variable angle is present in two or more distinct values lying in a range between 25 and 60 degrees;
      the intersection points define glueless joints of the metallic grid; and
      the metallic grid is a non-aluminum-based material.

12. The metallic grid structure of claim 11, wherein the metallic grid is either stainless steel or titanium.

13. The metallic grid structure of claim 11, wherein the plurality of intersecting ribs of the metallic grid are uniformly spaced to define a uniform pattern across substantially an entirety of a surface area of the metallic grid.

14. The metallic grid structure of claim 11, wherein at least one subset of the plurality of intersecting ribs of the metallic grid are non-uniformly spaced to define a variable pattern on the surface area of the metallic grid.

15. The metallic grid structure of claim 14, wherein a spacing between the at least one subset of the plurality of intersecting ribs is approximately double a spacing between the remainder of the plurality of interesting ribs.

16. A method of manufacturing a glueless grid and skin assembly for use in a composite laminate structure, the method comprising the steps of:
   providing a non-aluminum-based and planar component having a desired surface area and thickness;
   cutting the non-aluminum-based and planar component to define a metallic grid with a pattern defined by a plurality of intersecting ribs oriented in at least two distinct rib directions offset at a first variable angle of between 25 and 60 degrees relative to one another and defining respective intersection points, the first variable angle being present in at least two distinct values lying between 25 and 60 degrees;
   heating the metallic grid and a composite laminate skin having a plurality of ply layers comprising a plurality of tapes; and
   positioning the composite laminate skin adjacent at least one surface of the metallic grid and permitting the two to return to ambient temperature to define the glueless grid and skin assembly.

17. The method of claim 16, wherein the cutting is via a water jet cutting procedure.

18. The method of claim 16, wherein the first variable angle is no more than 35 degrees.

19. The method of claim 16, wherein the composite laminate skin is constructed from a carbon-based material.

20. The method of claim 16, further comprising a step of chilling the metallic grid and composite laminate skin to below ambient temperature for at least ten minutes.

* * * * *